United States Patent [19]

Wieman et al.

[11] Patent Number: 4,964,928

[45] Date of Patent: Oct. 23, 1990

[54] PLOW DISC BLADE DECORATIVE ARTICLE

[76] Inventors: Martha Wieman; Mark Wieman, both of 272 Yaupon Cove, Livingston, Tex. 77351

[21] Appl. No.: 406,448

[22] Filed: Sep. 13, 1989

[51] Int. Cl.[5] .......... B23K 7/00

[52] U.S. Cl. .......... 148/9 R; 428/913.3

[58] Field of Search .......... 148/9 R, 13, 134; 428/542.2, 542.6, 913.3

[56] References Cited

U.S. PATENT DOCUMENTS 3,852,870 12/1974 Elliot .......... 428/542.2

4,578,318 3/1986 Schoch et al. .......... 428/542.2

FOREIGN PATENT DOCUMENTS 1030679 2/1986 Japan .......... 428/542.2

*Primary Examiner*—S. Kastler

*Attorney, Agent, or Firm*—Harrison & Egbert

[57] ABSTRACT

A method of manufacturing a wall-hanging and similar decorative articles from a conventional plow disc replacement blade is provided. In accordance with the preferred embodiment of the present invention, a plow disc blade is manufactured into a new and improved wall hanging by a series of conditioning, cutting, grinding, sanding, heat treating, and sealing steps. Under the method embodying the present invention, the central figure and its border comprising the wall hanging are efficiently and reliably cut from the said plow disc blade using a hand-held plasma torch. The instant method includes heat treating the plow disc using a conventional oxyacetylene torch to color its convex surface. In accordance with the present invention, the surfaces of the resulting decorative article are also sealed from air to prevent oxidation thereof.

33 Claims, 1 Drawing Sheet

FIG. 1
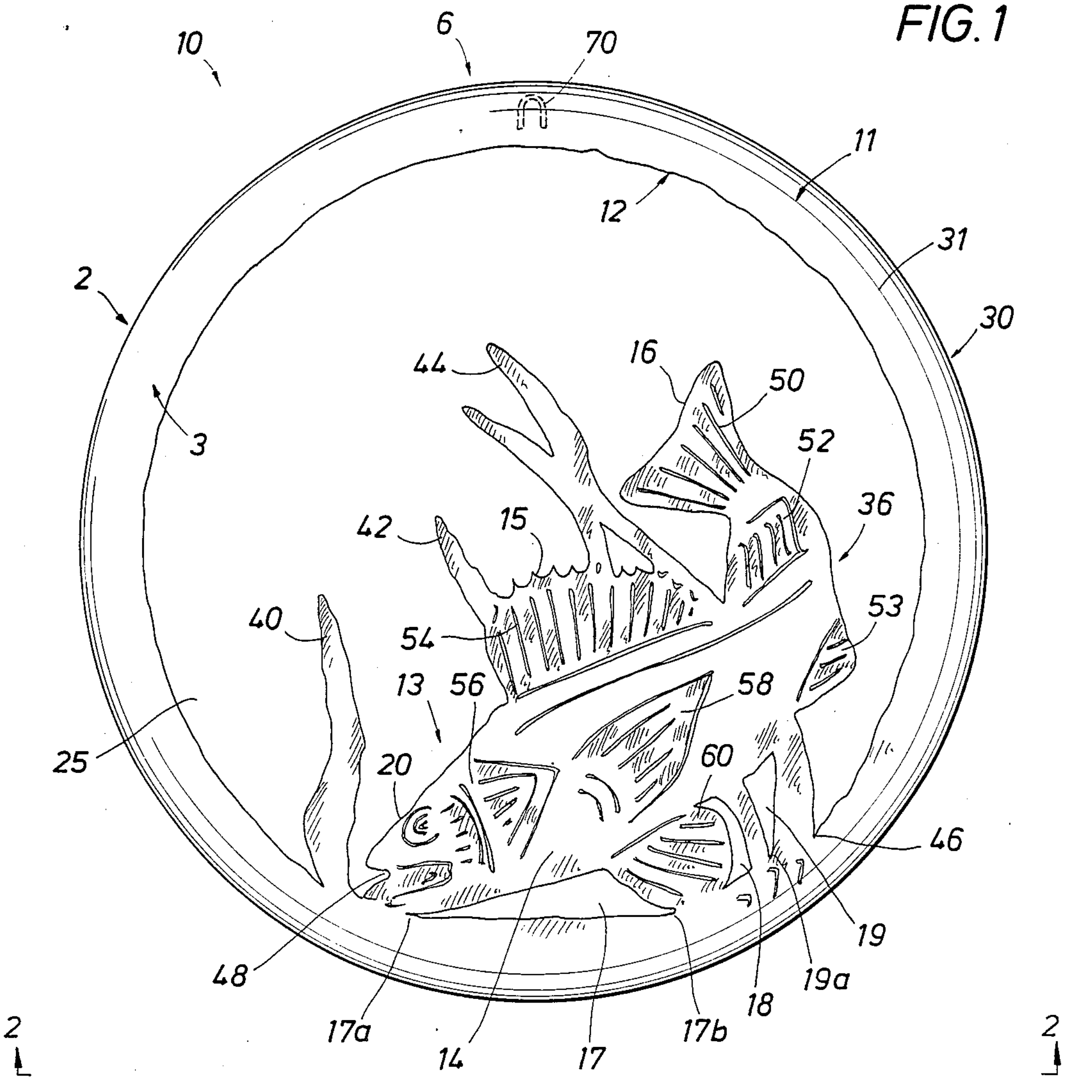
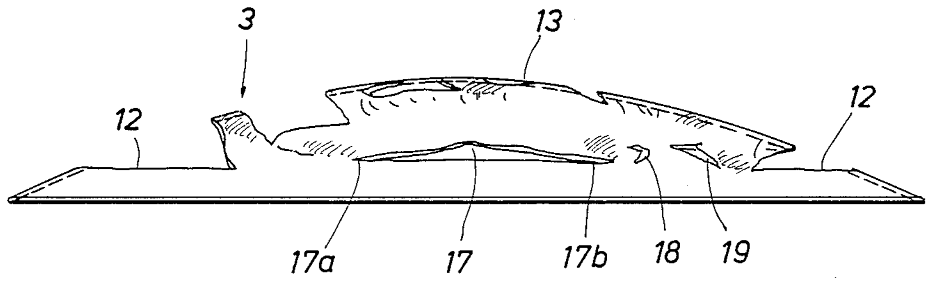
FIG. 2

PLOW DISC BLADE DECORATIVE ARTICLE

BACKGROUND OF THE INVENTION

This invention relates to decorative articles, and more particularly relates to methods for manufacturing wall hangings and similar decorative articles from plow disc blades.

It is well known in the prior art that circular plow disc replacement blade are used to repair plows by replacing blades thereof on a farm and the like. Such a circular plow disc blade is typically constructed of steel with either a smooth or a notched, serrated edge. As is well known to those skilled in the farming art, such plow disc blades have a substantially rectangular center hole through which they are typically cascaded together by being disposed axially on a bar which is disposed orthogonally behind a tractor and pulled thereby to till soil and rotate crop silage.

Thus, the use of such plow discs has heretofore been limited to the repair of plows by replacing the damaged blades thereof. The manufacture of decorative wall hangings and the like from plow disc blades has been unknown in the prior art.

It is also well known in the prior art that a hand-held torch is a useful device for cutting forms and shapes in a metal work piece. It is also well known to those skilled in the art that the limitations and disadvantages of the conventional oxyacetylene torch, including slow heating of metallic surfaces and inaccurate cutting behavior, have been substantially overcome by the plasma torch.

For example, in U.S. Pat. No. 2,976,907, Harvey discloses a magnetic forming method, and apparatus therefor, to shape the surface of a metallic work piece using the magnetic field of high flux density. In this method, current induced in the work piece produces a sufficient impulsive force to effect deformation of the surface thereof. More particularly, plasma received at the portion of the work piece to be shaped, is accelerated by a magnetic field to transfer energy thereto. Accordingly, the impinging plasma provides sufficient mechanical force to alter the work piece's shape. Banas, et al., in U.S. Pat. No. 4,122,240, generally discuss the application of lasers for deep melting of a metallic surface to effectuate welding and cutting thereof. Similarly, Dube, in U.S. Pat. No. 4,767,102, discloses a conventional plasma arc torch of lightweight design with a capacity for accurate cutting of prescribed shapes in metallic objects. Providing means for effectively guiding the nozzle of plasma torch under the influence of an electric motor stored in the handle thereof, the Dube device enables the nozzle to travel along a template surface, thereby cutting straight, curved and arcuate lines without limitation or the necessity for special tools.

This improved plasma cutting technology has been used to cut holes in metal samples and to make linear cuts in thick metal plates. As an example, U.S. Pat. No. 3,153,133, Ducati discloses an apparatus and method for cutting electrically-conductive work pieces by using an electrical plasma jet torch adapted to direct jets of high temperature plasma against opposite sides of a work piece. This methodology provides the ability to efficiently make ridge-free cuts even in thick metal plates.

In U.S. Pat. No. 4,778,155, Suchevich, improves upon the prior plasma torch art of cutting irregularly shapes or large circular holes in metal work pieces, by teaching a torch-aiming assembly for cutting holes of predetermined size in these work pieces, whereby small, accurate holes may be cut therein. Similarly, Tylko, in U.S. Pat. No. 4,60,640, teaches a method of cutting a multiplicity of pieces in a predetermined pattern from a work piece, whereby a plasma torch and metal work piece move relative to each other.

Accordingly, these developments and advantages of the prior plasma torch art have been applied to the manufacture of wall hangings and other decorative articles with the present invention, and improved means and techniques are provided which are especially useful for accurately and efficiently cutting a diversity of shapes into the surface of a conventional plow disc blade, and for the manufacture of a new and improved decorative article therefrom.

SUMMARY OF THE INVENTION

The present invention provides a method of manufacturing a decorative article from a plow disc replacement blade. In accordance with the preferred embodiment of the present invention, a plow disc blade, consisting of an anterior convex surface and a posterior concave surface, is manufactured into a new and improved wall hanging by a series of conditioning, cutting, grinding, sanding, heat treating, and sealing steps. More particularly, in accordance with the present invention, the preferred method comprises the steps of conditioning the convex surface of the plow disc, outlining the periphery of a figure on this convex surface, and pronouncing or emphasizing the outline. The method further includes framing this figure by forming a border therearound. The method further includes cutting the figure and its border with a plasma torch. Next, the method includes removing the conditioning means from the convex surface of the plow disc blade. The preferred embodiment of the present invention further includes welding ring means to the concave surface of the plow disc blade to enable hanging thereof, and then, air cooling the weld. The method next includes grinding these border and figure surfaces, sanding all of the convex and concave surfaces for heat treating, and then heat treating the plow disc blade to color its convex surface. The present invention further includes air cooling the plow disc to render these colors permanent, and cleansing its surfaces to eliminate any residual oils, salts and moisture. The method also includes sealing these surfaces from air to prevent oxidation thereof.

Accordingly, it is a feature of the present invention that a conventional circular plow disc replacement blade is converted into an attractive and distinctive wall hanging.

It is an object and feature of the present invention to provide an efficient and reliable method of manufacturing a decorative article from a conventional circular plow disc replacement blade.

It is also an object of the present invention to provide an unusual, decorative wall hanging not heretofore known in the prior art.

It is a further object of the present invention to provide a method to utilize the prior plasma torch art to produce decorative articles for wall-hanging and the like.

It is a further object of the present invention to provide a method to utilize the prior plasma torch art to achieve accurate and detailed cuts of unlimited shape in the surfaces of a plow disc blade.

It is still a further object of the present invention to provide a method of making a diversity of precise cuts into the surface of a plow disc blade in a time-efficient and safe manner.

It is a specific object of the present invention to provide a method of manufacturing a decorative article from a plow disc replacement blade, consisting of an anterior convex surface and a posterior concave surface, comprising the steps of conditioning said convex surface of said plow disc, said conditioning step comprising painting with a light-colored, enamel paint, outlining the periphery of a figure on said convex surface, emphasizing said outline by redrawing said periphery of said figure, framing said figure by forming a border therearound, cutting said figure and said border with a plasma torch, removing conditioning means from said convex surface by sandblasting, welding ring means to said concave surface of said plow disc to enable hanging thereof, air cooling said weld, grinding said surfaces of said border and said figure, sanding said convex and concave surfaces for heat treating, heat treating said plow disc using the open flame of an oxyacetylene torch to color said convex surface thereof, air cooling said plow disc to render said colors permanent, cleansing said surfaces of said plow disc using a solvent to eliminate any residual oils, salts and moisture, and eliminating residual debris and lint, after said solvent dries, and sealing said surfaces from air by applying a plurality of coats of finish to said concave and convex surfaces to prevent oxidation.

It is also a specific object of the present invention to provide a method of manufacturing a decorative article from a plow disc replacement blade, consisting of an anterior convex surface and a posterior concave surface, comprising the steps of conditioning said convex surface of said plow disc, said conditioning step comprising sandblasting with a powdered medium-to-coarse abrasive, outlining the periphery of a figure on said convex surface, emphasizing said outline by redrawing said periphery of said figure, framing said figure by forming a border therearound, cutting said figure and said border with a plasma torch, removing conditioning means from said convex surface by using a sanding disc, welding ring means to said concave surface of said plow disc to enable hanging thereof, air cooling said weld, grinding said surfaces of said border and said figure, sanding said convex and concave surfaces for heat treating, heat treating said plow disc using the open flame of an oxyacetylene torch to color said convex surface thereof air cooling said plow disc to render said colors permanent, cleansing said surfaces of said plow disc using a solvent to eliminate any residual oils, salts and moisture, and eliminating residual debris and lint, after said solvent dries, and sealing said surfaces from air by applying a plurality of coats of finish to said concave surface and one coat to said convex surface to prevent oxidation.

These and other objects and features of the present invention will become apparent from the following detailed description, wherein reference is made to the figures in the accompanying drawings.

IN THE DRAWINGS

FIG. 1 is a front view of a plow disc wall-hanging embodying the concept of the present invention.

FIG. 2 is a side view of the plow disc wall-hanging depicted in FIG. 1, along line 2—2.

DETAILED DESCRIPTION

Referring to FIG. 1, there may be seen a front view of plow disc wall-hanging 10, embodying the concept of the present invention. Plow disc wall-hanging 10 is preferably made from new plow disc blade 2. While the plow disc wall-hanging may be made from a used plow disc blade, such used blades have the disadvantage of suffering from irregular wear, and unknown surface blemishes and the like. Accordingly, to consistently produce wall hangings of the prescribed shape and color, in the unexpectedly short duration taught by the method embodying the present invention, new plow disc blades are preferred.

Plow disc blade 2 consists of a conventional circular plow disc replacement blade used to repair plows by replacing blades thereof on a farm and the like. Such a circular plow disc blade is constructed of steel with a diameter from 12-26 inches and a thickness of from 11 gauge (2 mm) to 7 gauge (4 mm). The plow disc blade may have a smooth edge or a notched, serrated edge. As is well known to those skilled in the farming art, such plow disc blades have a substantially rectangular center hole through which they are typically cascaded together by being disposed axially on a bar which is disposed orthogonally behind a tractor and pulled thereby to till soil and rotate crop silage.

Still referring to FIG. 1, there may be seen fish figure 13, constituting the central portion of plow disc wall hanging 10 carved out of convex face 3 of plow disc blade 2. Fish FIG. 13 consists of contiguous head portion 20, body portion 14, fin portion 15 and tail portion 16, and intervening void portions 17, 18 and 19. Also depicted are coral-like effects 40, 42 and 44. It is a feature of the method embodying the present invention that the shape of FIG. 10 may be accurately cut into surface 6 of plow disc 2 using a conventional plasma torch.

Now referring to FIG. 2, there may be seen a side view of the plow disc wall hanging depicted in FIG. 1, viewed along line 2—2 therein. Central FIG. 13 and circumferential border 12 are shown cut from convex surface 3. Also shown are intervening void portions 17, 18 and 19.

More particularly and referring again to FIG. 1, in accordance with the present invention, the outline of fish FIG. 13 is drawn upon convex surface 3. Since convex surface 3 is normally painted black, said outline may be made thereon using a soapstone marker. As is well known among those skilled in the steel-welding art, soapstone is a light-colored marker which tolerates heat and is visible on the surface of steel until the steel is removed by either melting or cutting.

It should be apparent to those skilled in the art that the said central figure disposed on surface 3 may be virtually any wildlife form, childlike figure, and any other suitable figure. As is also well known in the art, steel may be marked by a graphite marker after its surface is specially conditioned. Thus, prior to outlining the predetermined figure with a graphite marker, convex surface 3 is modified from being cloaked by a black color to being cloaked by a light color. Specifically, the surface is preferably conditioned by being painted by a light-colored glossy enamel paint. An inexpensive, common enamel paint is preferably sprayed onto convex surface 3 to promote the quick application and drying thereof. It should be apparent to those skilled in the art that a common latex paint should not be used because it cannot withstand the high surface temperatures that are realized thereon. As is also well known in the art, a glossy paint is more tolerant of elevated temperatures than a flat paint. The paint also provides a layer of insulation, whereby the metal surface does not tend to change its color during the cutting step.

Alternatively, the surface may be conditioned by being sandblasted with a conventional powdered medium-to-coarse aluminum oxide grit abrasive or the like. Penetrating into the metal surface, however, sandblasting is not as reliable a conditioning step as the hereinbefore described painting with a light-colored glossy enamel. In particular, it has been determined that sandblasting renders the metal susceptible to premature coloration during the cutting step.

The predetermined outline of FIG. 13 is made by freehand drawing or by tracing the shape onto convex surface 3. Commonly used carbon paper, as for instance Burroughs Company's Nu-Kote product number 60-10-11 ½, is effective for this tracing procedure. The outline is then redrawn to insure that the marking is retained on surface 3 notwithstanding its being subjected to high temperatures provided by the said plasma torch. Indeed, these markings are retained thereon until the underlying surface thereof is either melted or cut.

Contemporaneously with the hereinbefore described method of marking the outline of a predetermined shape upon surface 3, a 1–2 inch circumferential border 12 is drawn within the outer edge of plow disc blade 10. This border 11 provides a professional and enclosed appearance with respect to framed FIG. 13.

An important feature of the present invention is the heretofore unknown application of plasma torch technology to the detailed and precise cutting of shapes upon the surface of plow disc blades and the like. An example of a plasma torch which may be used by those skilled in the art is the Thermal Arc Pak 5 XR torch sold by Thermal Dynamics Corporation.

It is well known that conventional plasma cutting technology applies a plasma, which is a gas heated to elevated temperature and then ionized to render the gas electrically conductive. More particularly, the torch delivers plasma to the prescribed metal surface, thereby transferring an electric arc thereto. The metal surface is cut by the metal being caused to melt and then this molten metal being physically removed.

It is a feature of the hereinbefore described Thermal Dynamics torch that compressed air is used as not only plasma, but also as secondarY gas. When the tip of this torch contacts the metal surface, a stiff, constricted cutting arc is produced, thereby delivering focused elevated temperatures to a small predetermined surface area. The secondary compressed air is channeled outwardly and circumferentially with respect to the torch-tip, to cool the components thereof.

Torches which have been heretofore applied by those skilled in the welding art have been the standard oxyacetylene torch. This old technology also consists of first melting the metal and then physically removing it by the force of an oxygen jet. As is well known, the use of the oxyacetylene torch for custom cutting of shapes into steel which will be described in detail, has burdened practitioners with several limitations. For example, the heating of the metal surfaces has been relatively slow. In addition, once the metal surfaces reach a molten state, due to the nature of the oxyacetylene flame, inherently broad and inaccurate cuts were made which had the affect of inadvertently heating environing metal surfaces. Not only does this cause deterioration in the definition of the predetermined and drawn outline, but also cause warping and consequent distortion to the metal surface. Accordingly, it has been necessary in the prior art to intermittently allow the metal surface to cool before proceeding with the cutting thereof.

Application of plasma torch technology to the cutting of figures upon the convex surface of plow discs overcomes these hereinbefore described limitations and disadvantages of the prior art. Conventional plasma cutting torches are designed with a concentric ring of gas jets which cause cooling of metal environing the immediate cutting area. Accordingly, it should be apparent that this cooling effect avoids the warping and distortion that frequently occurs when cutting with the oxyacetylene torch. It should also be apparent that the high frequency cutting jet electrically generated with the plasma torch enables a precise, fine cut to be made on the metal surface. Cuts achieved in accordance with the teachings of the present invention typically realize an accuracy of 1/16th inch, about 2 mm. It should also be clear to those skilled in the art that the inherent cooling capability of the plasma torch enables detailed cuts to be made without interruption, thereby providing an efficient method of manufacture thereof. Indeed, using the preferred embodiment typically results in reducing the total time to produce a plow disc wall-hanging from 2–4 hours to approximately 30 minutes.

Still referring to FIG. 1, the respective contour, accent and detail aspects of fish FIG. 13 illustrate these unique advantages of the present invention. The plasma torch easily achieves the shape of fin portion 15 and the characteristic contour of tail portion 16. A particularly striking benefit of the method embodying the present invention is demonstrated by the precise cuts which must be made between void areas 17, 18 and 19 and the inner edge 12 of circumferential border 11. Not only does this aspect of the fish figure require accurate cuts for the beauty of the figure to be realized, but also it requires that there be virtually no distortion at the said boundary thereof, in order to avoid the destruction of one or more of these boundaries. More particularly, void area 17 requires accurate, fine cuts to maintain the integrity of vertices 17*a* and 17*b*. Similarly, void area 18 requires accurate, fine cuts to maintain the integrity of its narrow trapezoidal shape, and void area 19 requires accurate, fine cuts to maintain, inter alia, the integrity of vertex 19*a*.

Also indicative of the unique cutting technique taught by the present invention, are the articulated shapes of environmental coral structures 40, 42 and 44. It should be clear that mouth shape 48 and juncture 46 require precision cuts to effectuate the demanding configurations depicted in FIG. 1. This advantageous cutting capability is further illustrated by the diversity of narrow accent outs in fin surface areas 54 and 60, gill areas 56 and 58, and tail areas 50, 52 and 53.

Under the concept of the present invention, once the cutting of the central figure and the environing border have been completed, the paint contained on convex surface 3 is removed. The paint removal is accomplished by sandblasting said surface preferably with an aluminum oxide grit abrasive. Alternatively, surface 3 may be sanded with an aluminum oxide grit sanding disc.

After the paint has been removed from the convex surface of the preferred embodiment metal ring 70 is welded onto top portion 6 of concave surface 4 disposed on the posterior side of plow disc 2. Metal ring 70 may be a washer, a U-shaped, heavy-duty staple or even part of a chain-link. It should be apparent that metal ring 70, attached to the top, concave side of border 11, functions as means to hang the plow disc on a wall and the like. It should be clear from the foregoing description of this hanging function, that ring 70 is disposed on concave border 6 to enable the plow disc to hang flat against the wall with the figure disposed in an upright position.

This weld is preferably air-cooled to avoid crystallization. Once this weld cools, an abrading step is performed to both eliminate slag asperities from these surfaces and to impart a smooth, faceted appearance thereto. More particularly, slag asperities are removed from the surfaces of plow disc wall hanging 10 by performing coarse grinding. As should be apparent, the purpose of the grinding is to prevent injury incident to handling of the wall hanging. First, convex surface 31 of border 11 and convex surface 35 of central FIG. 13 are ground using preferably a coarse aluminum oxide abrasive on preferably a 4 inch angle grinder. Next, concave surface 30 of border 11 and concave surface 36 of central FIG. 13 are similarly ground.

After this coarse grinding has been completed in accordance with the present invention, the convex surfaces are prepared for heat treatment by being subjected to a sanding step. In particular, convex border surface 31 is ground unidirectionally, either clockwise or counterclockwise, with preferably a 7 ½ inch angle grinder using a #24 grit aluminum oxide sanding disc to provide a faceted appearance to the surface thereof when disposed in ultraviolet light. Contact with surface 31 is achieved with the leading edge of the sanding disc which follows the plow disc blade's inherent curvature. Central portion 13 is ground with the said #24 grit aluminum oxide sanding disc parallel to the curvature of the surface of the plow disc blade proximal thereto, eliminating scratches and indentations.

This sanding step is followed by grinding with a finer #60 grit aluminum oxide sanding disc. Unlike the faceted effect obtained from this fine grinding of the border portion, the resulting surface preferably should appear to be smooth with no cross-graining thereon.

In accordance with the concept of the present invention, once the hereinbefore described sanding step is completed, further handling of the plow disk wall hanging by naked hands should be avoided to protect the surface thereof from body oils, salts and moisture. As is common in the art, leather welding gloves and the like may be worn to avoid contamination of the treated surface.

It is also a feature of the present invention that the attractive and distinctive coloring displayed on the convex surface of the plow disc wall hanging is achieved by the controlled heat-treating thereof with a conventional oxyacetylene torch. More particularly, as is well known to those skilled in the art, by varying the distance between the open flame of an oxyacetylene torch and the metal surface, as well as the flame's direction, the duration of a particular region of this surface's exposure to elevated temperatures is conveniently controlled, thereby rendering various attractive colors thereon. It is a feature of the present invention that the flame of the oxyacetylene torch should preferably be directed against the concave side of the plow disc blade to avoid a marbling appearance on the convex side thereof. Where such a marbling appearance is intended, however, the flame is directed onto the convex surface of the plow disc blade.

It is preferable to render the darker colored areas first, and then to make appropriate adjustments to neighboring lighter colored surface regions. Additionally, the heat transfer is limited by the concentration of accent cuts in the metal surface. As should be apparent to those skilled in the art, this coloring step cannot effectively be achieved with a plasma torch as hereinbefore described or the like, because it does not have the prerequisite open flame. As hereinbefore described, a plasma torch achieves its functions via an electric arc, instead of such an open flame.

Subsequent to this heat treatment step, the plow disk wall hanging is air-cooled. In order to retain its hereinbefore described surface coloration, the plow disc blade should preferably be hung vertically in an environment with no significant drafts or direct air-conditioned currents which may adversely affect the treated surfaces thereof. Additionally, the plow disc should preferably not be situated in direct sunlight during this air-cooling step.

The last step in the manufacture of the plow disc wall hanging, in accordance with the present invention, is to seal the bare metal surface thereof. However, prior to sealing, all of its surfaces should preferably be purged of any residual body oils, salts or moisture. Thus, a conventional organic solvent like acetone is applied to the said surfaces by a gentle wiping action preferably using a paper towel. A common rag may also be used to apply the solvent but such a rag tends to introduce lint onto the finished disc surfaces.

Once the solvent evaporates, a specially treated rag is drawn across the surfaces to eliminate any residual debris or lint. One such rag is product number 49008-9 named "tack rag" manufactured by the Norton Company of Worcester, Massachusetts. This tack rag collects sanding residue and loose dust to promote a sealant imparting a olean finish upon the plow disc blade's metal surfaces.

Sealing of the surfaces of the plow disc wall hanging is accomplished by brushing a clear, glossy polyurethane finish thereon. A typical sealant is High Gloss 70 Polyurethane manufactured by Red Devil Paints and Chemicals, Mount Vernon, New York. Another suitable sealant is Incralac which is an acrylic product of Stan Chem Inc. of East Berlin, Connecticut, identified with product number 69X1732-12. To avoid the formation of air bubbles or brush marks on plow disc surfaces, a foam polyurethane brush is used. While only one sealant coat is applied to the concave surface, the edges of the central figure, and the edges of the circumferential border, it is advantageous to apply a plurality of coats to the convex surface of the figure. In accordance with the present invention, it is preferable to apply the sealant thrice to these surfaces to produce a substantially airtight product. As should be apparent to those skilled in the art, after the application of each coat of sealant, the plow disc blade is allowed to air-dry prior to the application of the next coat.

It is within the concept of the present invention to optionally provide a surface texturing step, after the sanding step, to impart controlled scoring or etching upon the surface of the plow disc blade. In one embodiment of the present invention, a matted finish is achieved by sandblasting the metal surface using powdered aluminum oxide. In another embodiment, a smooth finish is achieved by sandblasting using glass beads. Virtually any desired surface texture may be achieved by sandblasting with the appropriate abrasive material.

It is also a feature of the present invention that figures which extend into the center hole portion of a plow disc may be accommodated by welding a piece of metal of suitable shape and thickness into said center hole. More particularly, scrap metal from a previously cut plow disc is placed into the center hole of a preferably new plow disc and welded therein. The weld is then preferably coarsely ground on both the disc blades' convex and concave surfaces. The scrap metal, selected to be of approximately like thickness to the thickness of the new plow disc blades' hole portion, is cut into the appropriate size rectangular shape using a plasma cutting torch. As should be apparent to those skilled in the art, this thickness-matching selection of scrap metal provides the advantage that the color rendition resulting from the hereinbefore described heat-treating step is consistent in the filled hole and in surface areas adjacent thereto.

As hereinbefore stated, it is an object of the present invention to provide an efficient and reliable method of manufacturing a wall hanging and similar decorative articles from a conventional circular plow disc replacement blade. It should be apparent to those skilled in the art that the present invention affords a new and improved method of manufacturing wall hangings. It should also be apparent that the present invention provides a method of producing decorative articles heretofore unknown in the prior art.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to be measured by the scope of the appended claims herein.

What is claimed is:

1. A method of manufacturing a decorative article from a plow disc replacement blade, consisting of an anterior convex surface and a posterior concave surface, comprising the steps of:
   - conditioning said convex surface of said plow disc blade;
   - drawing the periphery of a figure on said convex surface;
   - framing said figure by forming a border therearound;
   - cutting said figure and said border with a plasma torch;
   - removing conditioning means from said convex surface;
   - abrading said surfaces of said border and said figure;
   - heat treating said plow disc blade to color said convex surface thereof;
   - air cooling said plow disc blade to render said colors permanent;
   - cleansing said surfaces of said plow disc blade to eliminate any residual oils, salts and moisture; and
   - sealing said surfaces from air to prevent oxidation.

2. The method of claim 1 wherein said conditioning step includes painting.

3. The method of claim 2 wherein said painting step includes using an enamel paint.

4. The method of claim 1 wherein said conditioning step comprise's sandblasting.

5. The method of claim 4 wherein said sandblasting step includes using a powdered abrasive.

6. The method of claim 1 wherein said drawing step comprises: outlining he periphery of a figure on said convex surface.

7. The method of claim 6 wherein said outlining step includes redrawing said periphery of said figure.

8. The method of claim 1 wherein said removing conditioning means step includes sandblasting.

9. The method of claim 1 wherein said removing conditioning means step includes using a sanding disc.

10. The method of claim 1 wherein said abrading step comprises:
   - grinding said surfaces of said border and said figure; and
   - sanding said convex and concave surfaces for heat treating.

11. The method of claim 1 wherein said heat treating step comprises applying the open flame of an oxyacetylene torch to said convex surface.

12. The method of claim 1 wherein said cleansing step comprises applying a solvent to said concave and convex surfaces.

13. The method of claim 12 wherein said cleansing step further comprises eliminating residual debris and lint, after said solvent dries.

14. The method of claim 1 wherein said sealing step comprises applying a plurality of coats of finish to said concave and convex surfaces.

15. The method of claim 14 wherein three of said coats are applied to said convex surface.

16. The method of claim 14 wherein one of said coats is applied to said concave surface.

17. The method of claim 1 including the further step of welding ring means to said concave surface to enable hanging of said article, and air cooling said weld.

18. The method of claim 17 wherein said welding step follows said removing conditioning step and precedes said grinding step.

19. A method of manufacturing a decorative article from a plow disc replacement blade, consisting of an anterior convex surface and a posterior concave surface, comprising the steps of:
   - conditioning said convex surface of said plow disc blade;
   - outlining the periphery of a figure on said convex surface;
   - redrawing said outline;
   - framing said figure by forming a border therearound;
   - cutting said figure and said border with a plasma torch;
   - removing conditioning means from said convex surface;
   - welding ring means to said concave surface of said plow disc blade to enable having thereof;
   - air cooling said weld;
   - grinding said surfaces of said border and said figure;
   - sanding said convex and concave surfaces for heat treating;
   - heat treating said plow disc blade to color said convex surface thereof;
   - air cooling said plow disc blade to render said colors permanent;
   - cleansing said surfaces of said plow disc blade to eliminate any residual oils, salts and moisture; and
   - sealing said surfaces from air to prevent oxidation.

20. The method of claim 19 wherein said conditioning step includes painting.

21. The method of claim 20 wherein said painting step includes using an enamel paint.

22. The method of claim 19 wherein said conditioning step comprises sandblasting.

23. The method of claim 22 wherein said sandblasting step includes using a powdered abrasive.

24. The method of claim 19 wherein said outlining step includes redrawing said periphery of said figure.

25. The method of claim 19 wherein said removing conditioning means step includes sandblasting.

26. The method of claim 19 wherein said removing conditioning means step includes using a sanding disc.

27. The method of claim 19 wherein said heat treating step comprises applying the open flame of an oxyacetylene torch to said convex surface.

28. The method of claim 19 wherein said cleansing step comprises applying a solvent to said concave and convex surfaces.

29. The method of claim 28 wherein said cleansing step further comprises eliminating residual debris and lint, after said solvent dries.

30. The method of claim 19 wherein said sealing step comprises applying a plurality of coats of finish to said concave and convex surfaces.

31. The method of claim 30 wherein three of said coats are applied to said convex surface.

32. The method of claim 30 wherein one of said coats is applied to said concave surface.

33. A method of manufacturing a decorative article from a plow disc replacement blade, consisting of an anterior convex surface and a posterior concave surface, comprising the steps of:

conditioning said convex surface of said plow disc blade;

said conditioning step including painting with an enamel paint;

outlining the periphery of a figure on said convex surface;

emphasizing said outline by redrawing said periphery of said figure;

framing said figure by forming a border therearound;

cutting said figure and said border with a plasma torch;

removing conditioning means from said convex surface by sandblasting;

welding ring means to said concave surface of said plow disc blade to enable hanging thereof;

air cooling said weld;

grinding said surfaces of said border and said figure;

sanding said convex and concave surface for heat treating;

heat treating said plow disc blade using the open flame of an oxyacetylene torch to color said convex surface thereof;

air cooling said plow disc blade to render said colors permanent;

cleansing said surfaces of said plow disc blade using a solvent to eliminate any residual oils, salts and moisture, and eliminating residual debris and lint, after said solvent dries; and sealing said surfaces from air by applying a plurality of coats of finish to said concave surface and one coat to said convex surface to prevent oxidation.

* * * * *